(12) United States Patent
Hennebert

(10) Patent No.: US 11,977,944 B2
(45) Date of Patent: May 7, 2024

(54) METHOD FOR VERIFYING THE HABILITATION OF A TERMINAL TO CHECK AN IDENTITY ATTRIBUTE OF A USER

(71) Applicant: COMMISSARIAT A L'ENERGIE ATOMIQUE ET AUX ENERGIES ALTERNATIVES, Paris (FR)

(72) Inventor: Christine Hennebert, La Tronche (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 17/653,919

(22) Filed: Mar. 8, 2022

(65) Prior Publication Data

US 2022/0292270 A1 Sep. 15, 2022

(30) Foreign Application Priority Data

Mar. 9, 2021 (FR) .................................. 21 02287

(51) Int. Cl.
*G06K 7/06* (2006.01)
*G06K 7/00* (2006.01)

(52) U.S. Cl.
CPC .................. *G06K 7/0021* (2013.01)

(58) Field of Classification Search
CPC ........ G06F 21/64; G06F 21/31; G06F 21/602; G06Q 20/4014; G06Q 20/3674; G06K 19/07749; G06K 7/0021; G06K 19/10
USPC .......................................... 235/441, 385, 380
See application file for complete search history.

(56) References Cited

U.S. PATENT DOCUMENTS

| | | | | |
|---|---|---|---|---|
| 10,042,782 B2* | 8/2018 | Struttmann | ............ | H04L 63/123 |
| 10,095,888 B1* | 10/2018 | Lee | ............ | H04L 9/14 |
| 10,135,835 B1* | 11/2018 | Kandel | ................ | H04L 9/0637 |
| 10,678,694 B2* | 6/2020 | Park | ............ | H04L 9/40 |
| 2014/0279526 A1* | 9/2014 | Jackson | ............... | G06Q 20/405 |
| | | | | 705/44 |
| 2017/0364698 A1* | 12/2017 | Goldfarb | ............. | G06F 16/9024 |
| 2018/0075527 A1* | 3/2018 | Nagla | ................. | G06F 21/6218 |

OTHER PUBLICATIONS

French Preliminary Search Report dated Nov. 20, 2021 in French Application 21 02287 filed on Mar. 9, 2021, 2 pages (with English Translation of Categories of Cited Documents).

(Continued)

*Primary Examiner* — Daniel St Cyr
(74) *Attorney, Agent, or Firm* — Oblon, McClelland, Maier & Neustadt, L.L.P.

(57) ABSTRACT

A method for interrogating an electronic identity card by a terminal with a claim covering an identity attribute of the holder of this card. The terminal obtains an identity token of the CNIe then selects in a HD wallet an issuer account associated to the identity attribute covered by the claim. Afterwards, it forms a transaction including as arguments the identity token and the path in the arborescence of the wallet leading to the issuer account, this transaction then being transmitted to a blockchain. Afterwards, it is verified by consensus that the terminal is habilitated to issue a claim covering an identity attribute, and that the issuing address of the transaction corresponds to the identity attribute on which the terminal is habilitated to issue a claim.

10 Claims, 8 Drawing Sheets

(56) References Cited

OTHER PUBLICATIONS

Baars, "Towards Self-Sovereign Identity using Blockchain Technology", Jun. 21, 2017, ITU-T Draft: Study Period 2017-2020, Study Group 17, International Telecommunication Union, 90 pages.
White Paper, "Identity: A new asset class", https://kriptan.org/assets/docs/Kriptan_identity_White%20Paper%204.1.pdf XP055650961, Apr. 24, 2019, 53 pages.
Reed et al., "Decentralized Identifiers (DIDs) v1.0", W3C Working Draft, 2021, 96 pages.
Antonopoulos et al., "Mastering Ethereum", published in O'Reilly, 2018, 19 pages.

* cited by examiner

METHOD FOR VERIFYING THE HABILITATION OF A TERMINAL TO CHECK AN IDENTITY ATTRIBUTE OF A USER

TECHNICAL FIELD

The present invention relates to the field of electronic identity cards (CNIe). It also relates to that of blockchains and more particularly to that of key hierarchical deterministic wallets allowing signing transactions on blockchains.

PRIOR ART

Many countries have already adopted or will soon adopt electronic identity cards (CNIe) instead of conventional identity cards in the form of plastic cards. CNIes integrate an electronic chip adapted to emit tokens allowing verifying the identity of its holder. These electronic identity cards are issued by an administrative authority and the data contained therein are derived from a centralised registry.

The need for resorting to a decentralised digital identifier or DID (Decentralised IDentifier), currently being standardised by the IETF, has recently appeared. A decentralised digital identifier is a unique identifier of a person (and possibly of an object, an organisation or an abstract entity) which could be verified by a controller by using information stored outside the CNIe. This information may consist of identification elements, called identity attributes, generally stored in databases or devices of an information system. A blockchain is generally used together with these databases to store the references and the links allowing verifying these identification elements. A description of the decentralised digital identifier could be found in the document entitled "Decentralised Identifiers (DIDs) v1.0W3C Working Draft" published by the consortium W3C on Jan. 20, 2021.

Different examples if decentralised identity are known from the prior art, such as uPort, Sovrin and ShoCard.

The operating principle of a decentralised identity (DID) has been illustrated in FIG. 1. It involves an Issuer, 110, a Holder of an identity document, 120 and a Verifier. The issuer issues a question (claim) covering an identity attribute of the holder, 120, for example a question related to his age (adult person?). The holder has a cryptographic element related to its identity attribute, which could be verified by the verifier. The verifier verifies the supplied element and returns the reply to the considered question (Boolean "true" or "false") to the issuer.

The operation represented in FIG. 1 supposes that it is possible to verify that the issuer is entitled to ask the question on the identity attribute and that the verifier could check on that the holder is associated to the considered identity attribute.

Similarly, it is provided that a terminal (issuer) could issue a question on an identity attribute of a holder of a CNIe. The above-mentioned verification problems then arise in the same terms. In particular, it is necessary to check on that the considered terminal is habilitated to ask a question on an identity attribute of the holder and that this habilitation itself could be consulted by the holder.

Consequently, it is an object of the present invention to provide a method for verifying the habilitation of a terminal to ask a question on an identity attribute of the holder of a CNIe. A secondary object of the present invention is to provide an interrogation method covering an identity attribute of the holder of a CNIe.

DISCLOSURE OF THE INVENTION

The present invention is defined by a method for interrogating an electronic identity card, denoted CNIe, by a terminal, by means of a claim covering an identity attribute of the holder of this card, said identity attribute being part of an identity attribute arborescence, said method being original in that it comprises:

(a) the obtainment by the terminal of an identity token of the holder of the CNIe;
(b) the selection by the terminal of an issuer account associated to a node in the arborescence of a hierarchical deterministic key wallet, called HD wallet, having the same structure as the identity attribute arborescence, the selected node unequivocally corresponding to the identity attribute covered by the claim;
(c) the formation by the terminal of a transaction comprising as arguments at least the identity token and the path in the arborescence of the wallet leading to the issuer account;
(d) the issue by the terminal of said transaction addressed to a first smart contract deployed on a blockchain;
(e) the verification by consensus that the terminal is habilitated to issue a claim on said identity attribute;
(f) the verification by consensus that the issuing address of the transaction corresponds the identity attribute on which the terminal is habilitated to issue a claim;
(g) the record of an interrogation authorisation in the blockchain if the verifications of steps (e) and (f) are positive.

Typically, the identity token comprises a digital identifier of the holder of the CNIe as well as a nonce signed by a private key stored in the CNIe.

Advantageously, the verification of step (e) comprises the consultation of a record of said habilitation in the blockchain, the verification of an electronic signature of this record by means of the public key of an habilitation authority and, in case of success, the extraction of the path in the arborescence of the HD wallet leading to the issuer account as well as the code chain associated to the account of the terminal.

Preferably, said habilitation is recorded in the blockchain y means of a second smart contract distinct from the first one.

Advantageously, the verification at step (f) comprises a verification of the correctness of the signature of the transaction by means of the public key of the terminal.

It may further comprise a computation of the public key of the issuer account from the public key of the terminal, the code chain associated to the account of the terminal as well as the path in the arborescence leading to the issuer account.

The verification of step (f) may comprise a comparison of the address of the issuer account of the transaction with a hash of the public key of the issuer account thus computed, the interrogation authorisation being recorded in the block chain in case of identity.

In any case, the terminal may issue a query to an identity attribute server, said query representing said claim on the identity attribute and that the identity attribute server consults the blockchain to determine whether an authorisation has been delivered to the interrogation terminal relating to said identity attribute.

If the identity attribute server determines that the authorisation has actually been delivered, it requests a verification of the validity of the CNIe from an identity checkup server, the latter verifying the validity of the CNIe from the identity token read in the blockchain.

If the CNIe is determined to be valid, the identity attribute server builds the reply to the claim covering the identity attribute from a database of these attributes and transmits the reply to the terminal.

DESCRIPTION OF THE FIGURES

Other features and advantages of the invention will appear upon reading a preferred embodiment of the invention, described with reference to the appended figures among which.

DESCRIPTION OF THE EMBODIMENTS

In the following, an electronic identity card or CNIe, as introduced before, will be considered. It embeds cryptographic elements in a memory area allowing unequivocally identifying the holder of the card, for example a pair of a private key, a public key of a public key cryptosystem, for example an asymmetric cryptosystem and possibly an elliptic-curve cryptosystem. This cryptosystem is unequivocally associated to the digital identity of the holder of the considered card. The private key of the asymmetric cryptosystem is stored in a safety component of the CNIe ensuring protection thereof against logical and physical attacks.

Such a CNIe is capable of issuing identity tokens on request from an interrogation terminal. These tokens may be signed by means of the private key associated to the digital identity stored in the card. For example, these tokens may incorporate a digital identifier of the holder of the CNIe as well as a nonce signed by a private key stored in the CNIe, the presence of the nonce allowing avoiding man-in-the-middle attacks.

The interrogation terminal may be brought to formulate a query on an identity attribute of the holder of a CNIe. For example, a merchant may have to determine, by means of such a terminal, whether the client is major or minor, or an administration may have to verify the citizenship of the holder of the CNIe. Nonetheless, the terminal cannot arbitrarily interrogate the CNIe, it must possess a specific habilitation to be able to ask a question (also called verifiable claim or more simply claim) on either identity attribute, to the extent that access to the identity attributes and the processing thereof must be performed while complying with the protection of personal data, according to the GDPR regulations. This verification must be guaranteed in a certain way, if possible by design.

In general, the question is in the form of a verifiable claim covering an identity attribute, for example the age or the citizenship of the holder of the CNIe. Thus, for example, the question may be "is the holder of the CNIe is a major person?" or "what is the citizenship of the holder of the CNIe?". As the case may be, the reply may be a Boolean value (first example) or a series of alphanumeric characters (second example). It should be noted that the value of the attribute itself is not necessarily disclosed in the reply. Thus, the majority condition does not reveal the age of the person.

In the following, we will assume that the identity attributes are distributed according to a standardised graph and more specifically by a tree whose root is the identity of the holder and the nodes are attributes or attribute fields. In the following, for convenience, the attribute fields will be assimilated to attributes.

Figures 1, 2:
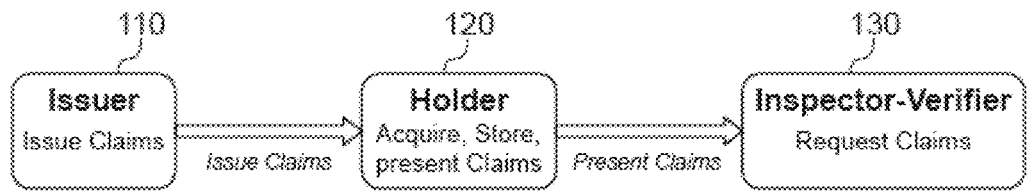
FIG. 1 already described schematically represents the operating principle of a decentralised identity.
FIG. 2 schematically represents a coding example of identity attributes of the holder of a CNIe.

The graph of the identity attributes could be represented by means of a file in a markup language such as JSON. FIG. 2 provides an example of such a file providing the attributes of a person. In this example, the age of the person could be deduced from the attribute "date of birth" herein located at the $6^{th}$ position. This attribute includes 3 attribute fields: day/month/year located respectively at the $1^{st}$, $2^{nd}$ and $3^{rd}$ positions. Thus, the year of birth of the holder of the CNIe is encoded by a path 0/6/3 in the tree of the attributes, or in an equivalent manner in the markup file. In general, each attribute or each attribute field may be represented by a path in the tree of the attributes.

The idea at the origin of the present invention is to encode by design the right of a terminal to issue a claim on an attribute, in other words the right to ask a question on an identity attribute, by embedding in this terminal a key hierarchical deterministic wallet (HD wallet), each node of the tree of the keys unequivocally corresponding to an identity attribute, and possibly to the field of such an attribute.

It should be recalled that, in a key hierarchical deterministic wallet, all of the private keys are generated, in an arborescent manner, from the same seed. In other words, the knowledge of the seed allows finding out all of the private keys of the wallet.

Figure 3:
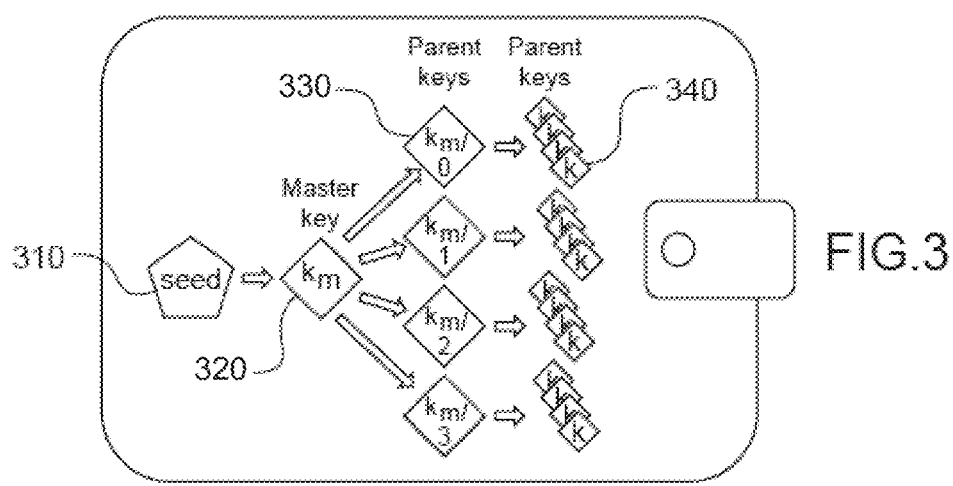
FIG. 3 schematically represents a key hierarchical deterministic wallet.

FIG. 3 schematically represents the structure of such a hierarchical deterministic wallet.

The seed, 310, at the origin of the key wallet is a random number (or entropy), for example on 128 or 256 bits. In general, it is represented by a mnemonic code formed by 12 or 24 words drawn from a predetermined dictionary including a predetermined number of words (2048).

Afterwards, the seed is hashed (for example by means of the hash function HMAC-SHA 512), to supply on the one hand a master private key, 320, ($k_m$) and an associated chain code (not represented).

Afterwards, the master public key is computed from the master private key by means of $PK_m = k_m \cdot G$ where G is the generator point of the elliptic curve.

At each generation, we obtain from a parent private key, 330, the chain code associated to this key and an index number, i, a child private key, 340, with a birth rank i+1 (the first child corresponding to the zero index). The generation of the private key involves a hash function (or a combination of hash functions forbidding the ability to go up to a parent private key from the private key of a child.

The generation of the private keys in a hierarchical deterministic wallet may be carried out according to different methods.

Figure 4A:
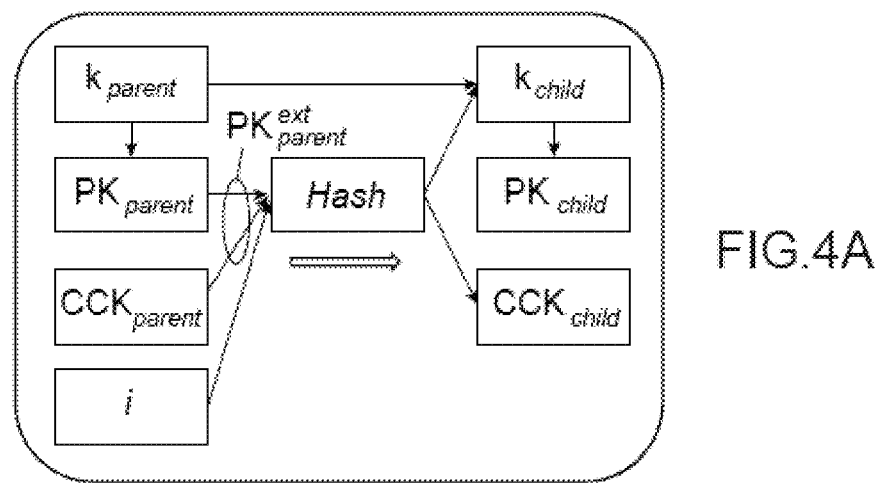
FIG. 4A schematically represents a first method for generating the private keys of a key hierarchical deterministic wallet.

FIG. 4A represents a first method for generating private keys in a hierarchical deterministic wallet.

To the left of the figure, are represented the elements relating to a parent private key and to the right those relating to a child private key, derived from this parent private key.

First of all, the parent private key, $k_{parent}$, allows generating the corresponding public key of the asymmetric cryptosystem, for example $PK_{parent}=k_{parent}G$ in the case of an elliptic-curve cryptosystem.

The parent public $PK_{parent}$ is concatenated to the associated code chain, $CCK_{parent}$, to form an extended public key $PK_{parent}^{ext}=PK_{parent}|CCK_{parent}$. This extended public key is combined with the index, i, of the child key that we wish to generate, then the whole is hashed by means of a hash function, Hash.

The result of hashing is split into a left portion and a right portion. The left portion is combined with the parent private key, $k_{parent}$, to give the child private key, $k_{child}$ whereas the right portion gives the code chain associated to the child key, namely $CCK_{child}$. The child private key, $k_{child}$, allows generating the child public key, $PK_{child}=k_{child}G$.

Consequently, we have elements $k_{child}$, $PK_{child}$, $CCK_{child}$ allowing iterating the generation of private keys once again.

The generation operation allowing switching from a parent private key into a child key with the index i is herein denoted $CKD_{priv}^n$. In other words:

[Math. 1]

$$k_{child}=CKD_{priv}^n(k_{parent}, i) \quad (1)$$

and therefore, by recurrence:

[Math. 2]

$$k_{child}=CKD_{priv}^n( \quad . \quad . \quad . \quad CKD_{priv}^n(CKD_{priv}^n (k_m,i_1),i_2)), \ldots ,i_N) \quad (2)$$

where N is the length of the path in the arborescence starting from the seed, and where $i_1, \ldots, i_N$ is the succession of the indexes of the child keys along the path.

Figure 4B:
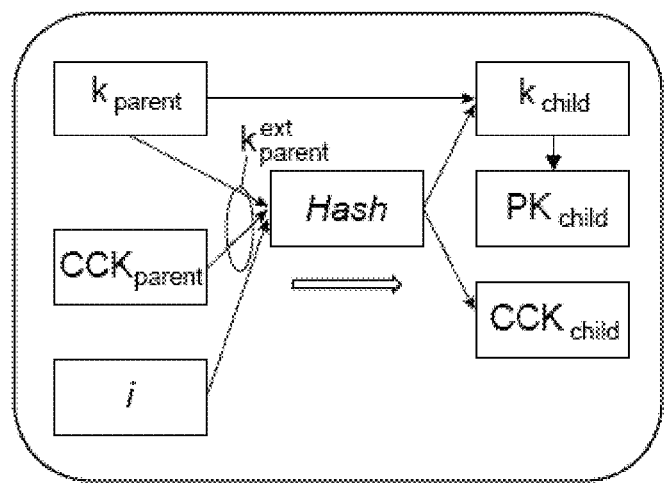
FIG. 4B schematically represents a second method for generating the private keys of a key hierarchical deterministic wallet.

FIG. 4B represents a second method for generating private keys in a hierarchical deterministic wallet.

In contrast with the so-called normal previous method, this so-called hardened generation method uses an extended private key instead of an extended public key to generate a private key of the next generation. It is a priori more robust than the normal method since it omits a piece of public information from the computation.

Like before, to the left of the figure, are represented the elements relating to a parent private key and to the right those relating to a child private key, derived from this parent private key.

The parent private key, $k_{parent}$, is concatenated with the associated code chain to form an extended private key $k_{parent}^{ext}=k_{parent}|CCk_{parent}$.

This extended private key is combined with the index, i, of the child key that we wish to generate, then the whole is hashed by means of a hash function, Hash.

The result of hashing is split into a left portion and a right portion. The left portion is combined like before with the parent private key, $k_{parent}$, to give the child private key, $k_{child}$ whereas the right portion gives the code chain associated to the child key, namely $CCK_{child}$. In turn, the child private key, $k_{child}$, allows generating the child public key, $PK_{child}=k_{child}G$.

The generation operation allowing switching from a parent private key into a child key with the index i is called hardened generation operation and denoted $CKD_{priv}^h$. In other words:

[Math. 3]

$$k_{child}=CKD_{priv}^h(k_{parent}, i) \quad (3)$$

If only hardened generation operations are used, we obtain by recurrence:

[Math. 4]

$$k_{child}=CKD_{priv}^h( \quad . \quad . \quad . \quad CKD_{priv}^n(CKD_{priv}^h (k_m,i_1),i_2)), \ldots ,i_N) \quad (4)$$

where, like before N is the length of the path in the arborescence starting from the seed, and where $i_1, \ldots, i_N$ is the succession of the indexes of the child keys along the path.

It should be noted that the generation of a private key of the wallet may successively involve normal generation operation and hardened generation operations along the path. Thus, more generally, this private key will be obtained by:

[Math. 5]

$$k_{child}=CKD_{priv}( \quad . \quad . \quad . \quad CKD_{priv} (CKD_{priv}(k_m,i_1),i_2)), \ldots ,i_N) \quad (5)$$

where each elementary generation operation $CKD_{priv}$ may be a normal generation operation $CKD_{priv}^n$ or a hardened generation operation $CKD_{priv}^h$.

In practice, the indexes i used in the normal generation operations and the hardened generation operations take on their values in distinct intervals. Thus, the indexes ranging from 0 to $2^{31}-1$ are used to generate private keys according to a normal generation operation and the indexes ranging from $2^{31}$ to $2^{32}-1$ are used to generate private keys according to a hardened generation operation.

In any case, a private key may be identified by means of a path in the arborescence from the master key. Thus, for example, $k_m/0/3$ will refer to the second generation private key, the $4^{th}$ normal child of the parent key, itself first normal child of the master private key. Similarly, $k_m/0/3'$ will refer to the second generation private key, $4^{th}$ hardened child of the parent key, itself first normal key of the master private key, where we conventionally consider $i'=i+2^{31}$.

A particularly interesting property of the key HD wallets is the possibility of deducing all of the public keys of the children from the master public key and the code chains, without the need for knowing the private keys of the children.

Figure 4C:
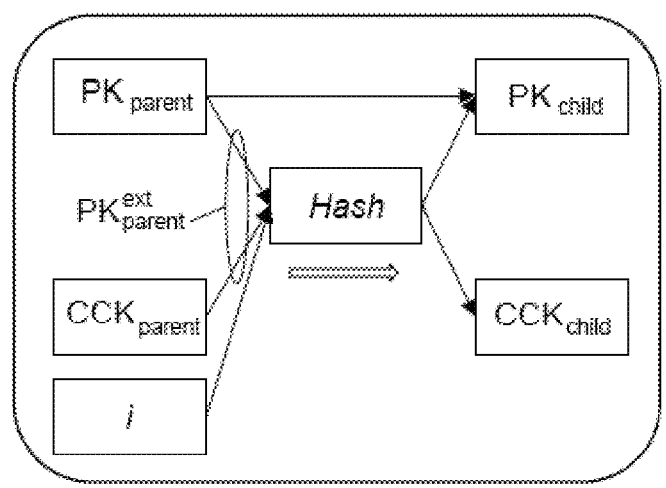
FIG. 4C schematically represents a method for generating the public keys of a key hierarchical deterministic wallet.

This property is illustrated in FIG. 4C.

The extended public key of a parent $PK_{parent}^{ext}=PK_{parent}|CCK_{parent}$, in other words the public key of a parent, $PK_{parent}$, concatenated with its code chain, $CCK_{parent}$, is combined with the index i of the child key for which it is desired to obtain the public key.

The whole is hashed by means of a hash function, Hash and the result of hashing is split into a left portion and a right portion. The left portion is combined like with the parent public key, $PK_{parent}$, to give the child private key, $PK_{child}$ whereas the right portion gives the code chain associated to the child key, namely $CCK_{child}$.

The operation allowing switching from the parent public key $PK_{parent}$ into the public key $PK_{child}$ of a child with the index i is denoted $PK_{child}=CKD_{pub}(PK_{parent},i)$.

Thus, the public key of a node of the arborescence may be obtained iteratively from the master public key:

[Math. 6]

$$PK_{child}=CKD_{pub}(\ldots CKD_{pub}(CKD_{pub}(PK_m,i_1),i_2)),\ldots,i_N) \quad (6)$$

where $i_1, \ldots, i_N$ is the succession of the indexes of the child keys along the path terminating at this node.

The hierarchical deterministic wallets have been the subject of standardisation in the documents BIP-32 and BIP-44. It is possible to find a detailed description of hierarchical deterministic wallets in the book of A. M. Antonopoulos and G. Wood entitled "Mastering Ethereum" published in O'Reilly in December 2018, pp. 79-97.

Figure 5A:
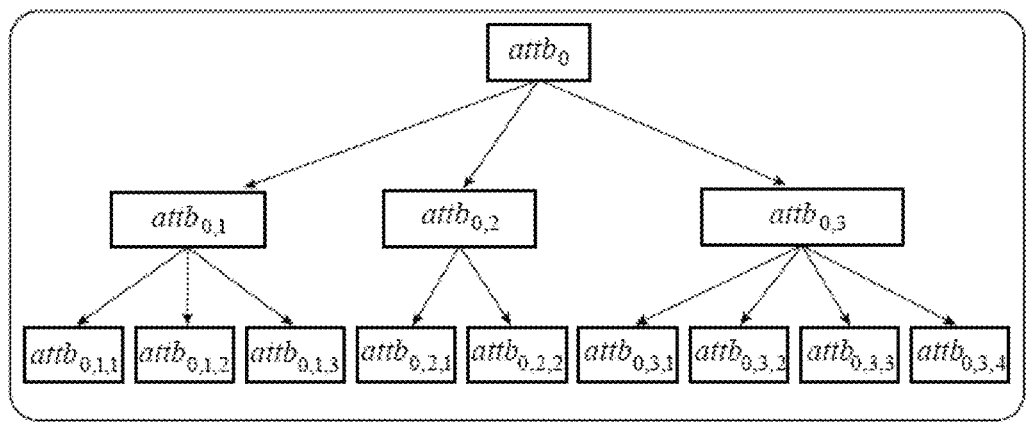
FIG. 5A represents an arborescence of identity attributes.
Figure 5B:
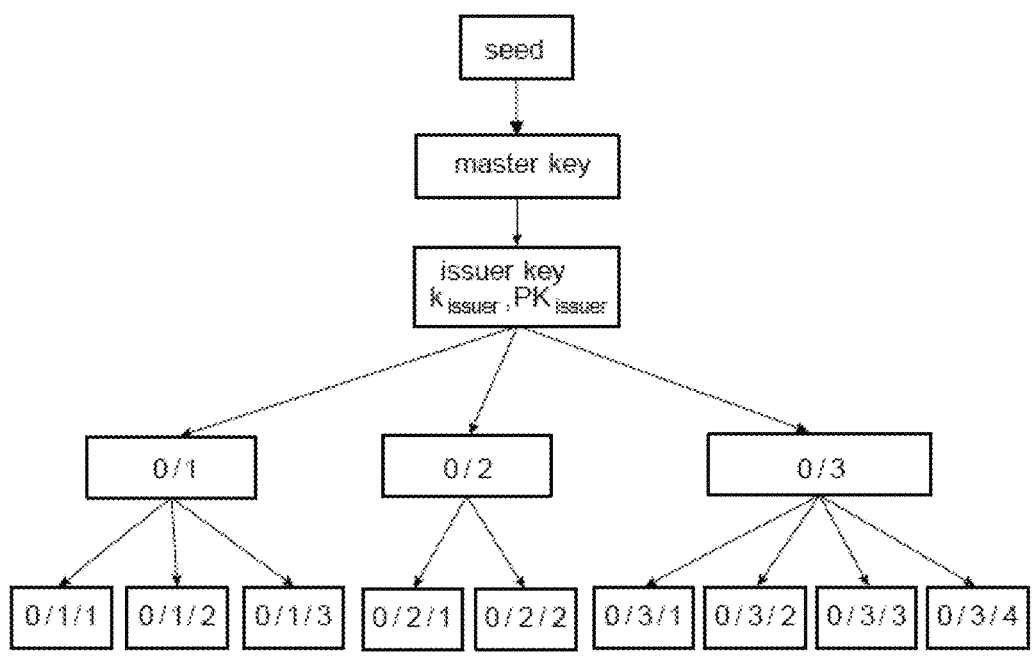
FIG. 5B represents a corresponding arborescence of keys in a hierarchical deterministic wallet.

The matching between the tree of the identity attributes and the tree of the keys of the HD wallet embedded in the terminal has been illustrated in FIGS. 5A and 5B.

FIG. 5A represents the tree of the identity attributes from the root $attb_0$ corresponding to the digital identity of the holder of the CNIe. The attributes directly depending on the root, $attb_{0,1}$, $attb_{0,2}$, $attb_{0,3}$ are first rank attributes, and those directly depending on these are second rank attributes, $attb_{0,1,1}$, $attb_{0,1,2}$, ..., $attb_{0,3,3}$, $attb_{0,3,4}$. Thus, by considering again the example of the attribute file of FIG. 2, $attb_{0,6,3}$ would represent the year of birth of the holder of the CNIe. Thus, each identity attribute $attb_{0,i_1,\ldots,i_N}$ is defined by a path $0/i_1/i_2/\ldots/i_N$ from the root.

FIG. 5B represents a key hierarchical deterministic wallet corresponding to the tree of the identity attributes of FIG. 5A.

The private key of the terminal, $k_{issuer}$ is obtained from the master private key itself derived from the secret seed. The public key of the terminal is obtained from its private key: $PK_{issuer}=k_{issuer} \cdot G$.

The public key $PK_{issuer}$ is used to generate a tree of public keys having the same structure as the tree of the identity attributes, according to the diagram explained with reference to FIG. 4C.

Each node of the arborescence is identified by a series of indexes representing a path covered from the root corresponding to the pair formed by the private key $k_{issuer}$ and the corresponding public key, $PK_{issuer}$, of the terminal. This root is conventionally represented by the index 0.

Thus, the public key of a node defined by the path $0/i_1/i_2/\ldots/i_N$ corresponds to the identity attribute $attb_{0,i_1,\ldots,i_N}$. To each node defined by the path $0/i_1/i_2/\ldots/i_N$ is associated a wallet account whose address, @wallet_account$_{0/i_1/\ldots/i_N}$ is obtained by hashing of its public key:

[Math. 7]

$$PK_{0/i_1/\ldots/i_N}=CKD_{pub}(\ldots CKD_{pub}(CKD_{pub}(PK_{issuer}),i_1)),\ldots,i_N) \quad (7\text{-}1)$$

[Math. 8]

$$@\text{wallet\_account}_{0/i_1/\ldots/i_N}=\text{Hash}(PK_{0/i_1/\ldots/i_N}) \quad (7\text{-}2)$$

Figure 6:
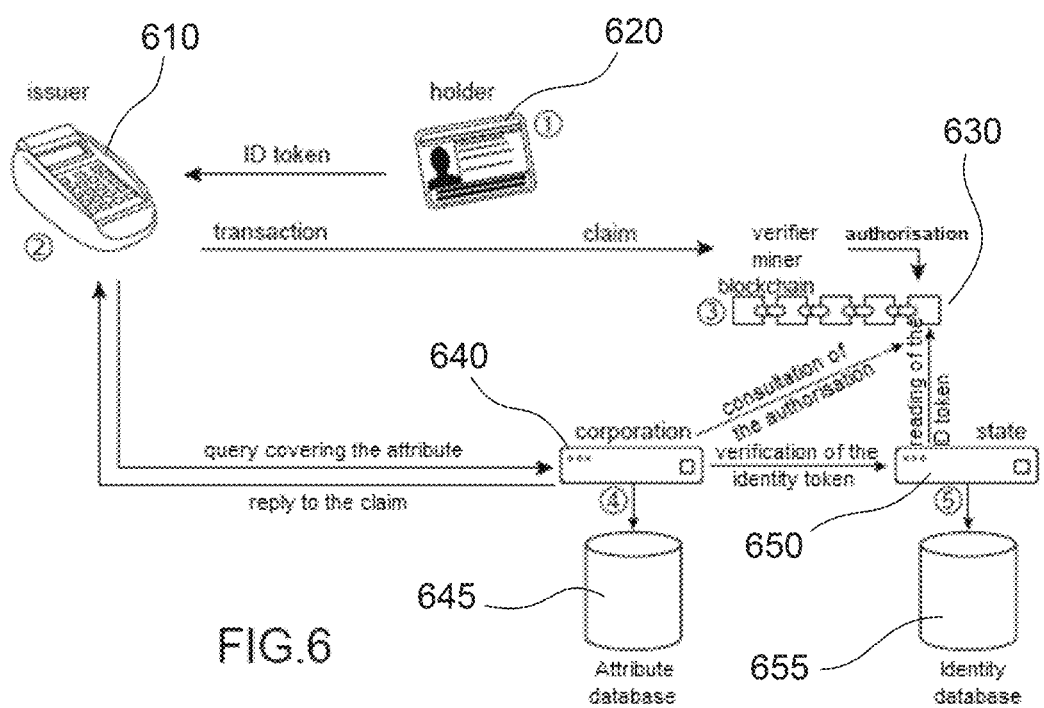
FIG. 6 schematically represents a use case of a method for interrogation by a terminal by means of a claim covering an identity attribute of the holder of a CNIe.

FIG. 6 schematically represents a use case implementing a method for interrogation by a terminal relating to a claim covering an identity attribute of the holder of a CNIe.

The represented system allows verifying whether a terminal has a right to interrogate an identity attribute of the holder, if the question asked by the terminal is compliant with this right and, if this is the case receiving a reply to the asked question on the identity attribute of said holder.

More specifically, the system comprises an interrogation terminal, 610, which may be in the form of a conventional payment device and possibly be integrated in such a device. Alternatively, the interrogation terminal may be remote, only the communication interface (RFID reader for example) being located in the location where the checkup of the identity attribute is performed.

The interrogation terminal embeds a key hierarchical deterministic wallet whose structure is identical to the arborescence of the identity attributes.

The interrogation terminal allows obtaining an identity token issued by the CNIe, 620. This token may be in the form of a signed nonce as described hereinabove. The communication between the terminal may be a BLE or RFID type contactless communication for example, and possibly a communication by direct physical contact.

Regardless of the process for obtaining the identity token, the terminal (claim issuer) is adapted to generate a verifiable claim (claim) covering an identity attribute of the holder of the CNIe, namely $attb_{0,i_1,\ldots,i_N}$.

The interrogation terminal selects in the arborescence of its HD wallet, the node corresponding to the attribute covered by this claim, in other words the account with the @wallet_account$_{0/i_1/\ldots/i_N}$.

The terminal then issues a transaction from the address @wallet_account$_{0/i_1/\ldots/i_N}$ addressed to a smart contract deployed on the blockchain, 630, for example the blockchain Ethereum, after having signed it with the private key $k_{issuer}$ of the terminal. Advantageously, the signature is an ECDSA signature comprising three components r, s, v from which it is possible to find out the corresponding public key, $PK_{issuer}$.

The transaction is then in the following form:

```
Transaction= {
    'from ' : @ wallet _account₀/ i₁/ .../ iN
    'to' : SM _auth
    ...
    'data' : auth _method , ID _token
    'path' : 0 / i₁ / i₂ / ../ iN
    }
    signed by k_issuer
```

The field 'from' specifies the address of the account that issues the transaction, in this instance that one associated to the node of the arborescence corresponding to the identity attribute covered by the claim.

The field 'to' specifies the address of the smart contract deployed in the blockchain to which the transaction is sent.

The field 'data' comprises the parameters of the transaction, in particular the plug-in address of the sub-program (also called method) to be executed in the smart contract, as well as the identity token received by the terminal.

The field 'path' specifies the path in the arborescence of the HD wallet leading to the account that issues the transaction. Where appropriate, this field also comprises the code chain of the issuer account, $CCK_{issuer}$.

Other fields could be considered yet without departing from the scope of the present invention.

The miners (or validators) of the blockchain determine in a first phase whether the terminal is habilitated to issue a claim covering an identity attribute and in a second phase whether the issued transaction corresponds to such a claim. In case of success, an authorisation is delivered to the terminal and recorded in the blockchain.

In a first phase, the miners verify the enrolment of the terminal, i.e. that the terminal is habilitated to issue a claim on the identity attribute.

In the context of the invention, the terminal generally belongs to a legal person (merchant, institution, company, etc.) and its habilitation to issue a claim on an identity attribute is delivered by a competent authority.

This habilitation is recorded beforehand in the blockchain by means of a second smart contract, SM_hab, distinct from the first one, SM_auth. For example, this record may be in the form of a digital certificate signed by the competent authority, issued from the account of the terminal (whose address is the hash of the public key $PK_{issuer}$), or an attestation signed by this authority, issued from an account of the latter.

The record comprises the identifier of the competent authority, for example its account address, the public key $PK_{issuer}$, the code chain $CCK_{issuer}$ (possibly encrypted) and the path $0/i_1/i_2/\ldots/i_N$ encoding the identity attribute. This information set is signed by the private key of the competent authority, the signature being itself part of the record.

First, the miners verify the signature of the record by means of the public key of the competent authority, then extract the path $0/i_1/i_2/\ldots/i_N$ defining the attribute for which the terminal has received the habilitation to formulate a claim as well as the code chain of the terminal, $CCK_{issuer}$.

In a second phase, the transaction is verified by the miners. If the transaction is properly built, it is recorded in the next block and the authorisation is recorded in the blockchain.

The verification of the transaction comprises several steps.

First of all, the public key $PK_{issuer}$ is extracted from the signature of the transaction issued by the issuer account. For example, this extraction is obtained by means of the function ECRecover in Ethereum.

From the public key $PK_{issuer}$, the code chain, $CCK_{issuer}$, obtained beforehand and the path specified in the field "path", namely $0/i_1/i_2/\ldots/i_N$, of the transaction, the public key of the issuer account is generated according to the expression (7-1).

Afterwards, we check on that the transaction has been issued from the issuer account by comparing the address @wallet_account$_{0/i_1/\ldots/i_N}$ indicated in the field 'from' with the hash of the public key generated at the previous step, in accordance with the expression (7-2). It is actually this step which allows confirming that the transaction issued by the terminal corresponds to an authorised claim, in other words for which it has obtained a habilitation by the competent authority.

Finally, we verify using the public key $PK_{issuer}$ that the signature of the transaction is correct.

If the verification of the habilitation and of the transaction is positive, an authorisation is granted to the terminal and is recorded in the blockchain.

Concomitantly with this double verification, the terminal transmits a query to an attribute server, 640, the query covering the identity attribute object of the claim. This query also comprises the identity token issued by the CNIe.

The attribute server 640 then consults the distributed registry of the blockchain to determine whether an authorisation to issue a claim on the identity attribute of the holder of the CNIe has been delivered to the terminal. If this is the case, the attribute server, 640, requests from the identity checkup server, 650, to check on the validity of the CNIe by transmitting the identity token thereto.

The identity checkup server, 650, consults a database, 655, managed by the state (and possibly an authority to which the competence has been sub-delegated), said base storing cryptographic information allowing verifying the existence and the validity of the CNIes.

If the identity checkup server determines that the CNIe is valid, it informs the attribute server. The latter then processes the query by accessing the requested attribute in the attribute database, 645, and returns to the terminal the reply to the claim covering the attribute.

Figure 7A:
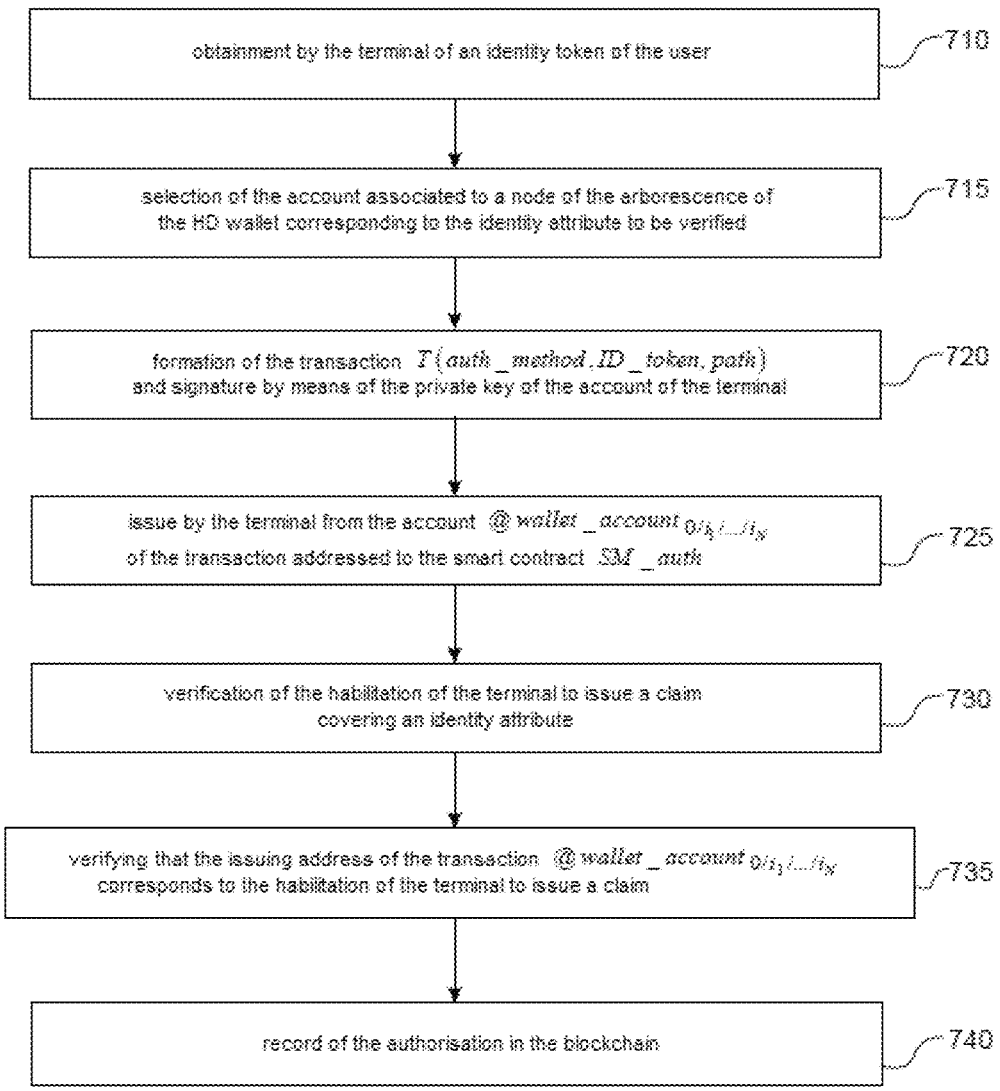
FIGS. 7A and 7B schematically represent a method for interrogation by a terminal by means of a claim covering an identity attribute of the holder of a CNIe.
Figure 7B:
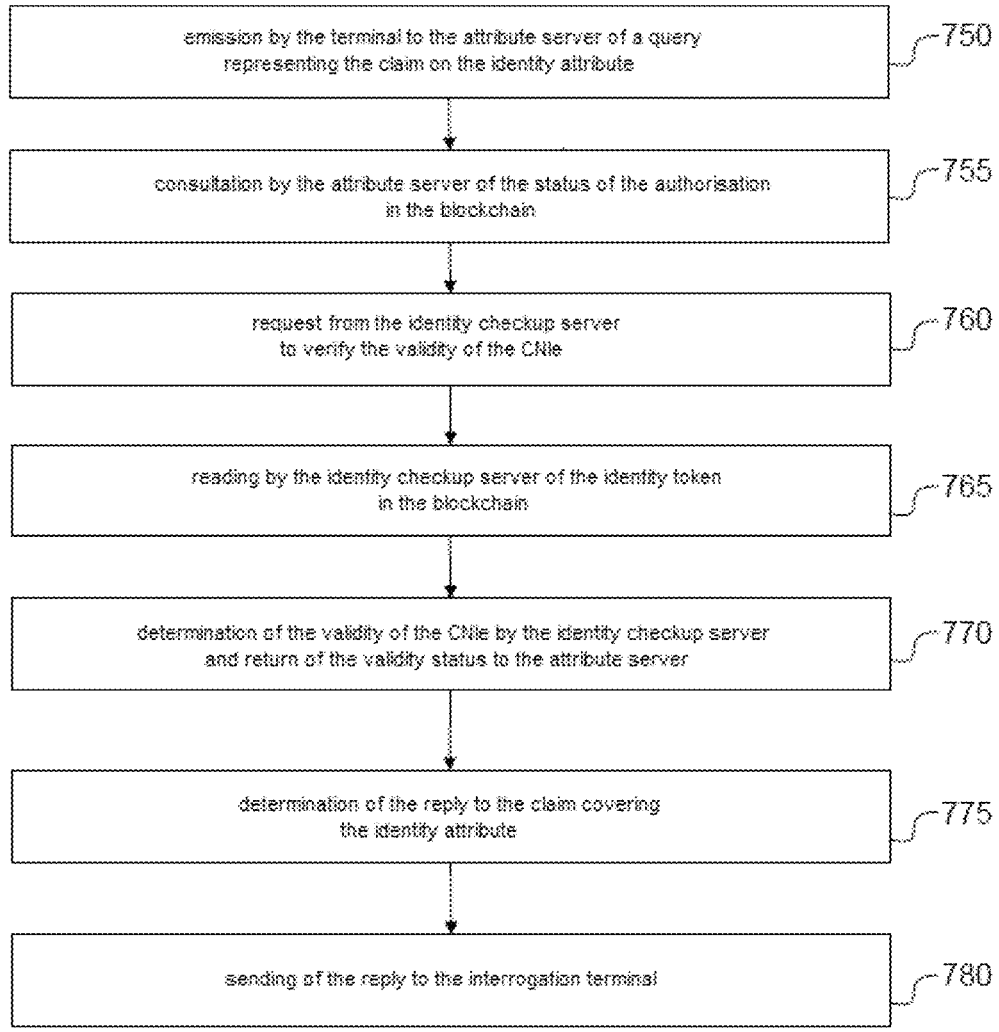

FIGS. 7A and 7B schematically represent a method for interrogation by a terminal by means of a claim covering an identity attribute of the holder of a CNIe.

At step 710, the interrogation terminal obtains an identity token, for example in the form of a nonce signed by the private key associated to the digital identity stored in the electronic national identity card.

At step 715, the interrogation terminal selects a node in the arborescence of its key HD wallet corresponding to the identity attribute it wishes to be covered by a claim.

At step 720, the interrogation terminal forms a transaction T(auth_method, ID_token, path) and the sign by means of the private key of the terminal, $k_{issuer}$.

At step 725, the interrogation terminal transmits the transaction thus signed to the smart contract SM_auth from the wallet account address @wallet_account$_{0/i_1/\ldots/i_N}$ where $0/i_1/i_2/\ldots/i_N$ is the path, path, defining the considered identity attribute.

At step 730, the habilitation of the terminal to issue a claim covering an identity attribute is verified by consensus.

At step 735, the correspondence of the issued transaction with a claim on this identity attribute is verified by consensus.

In case of success, in other words, if the verifications of steps 730 and 735 are positive, an interrogation authorisation is recorded in the blockchain at 740.

The method is carried on at step 750 in FIG. 7B.

Figure 8:
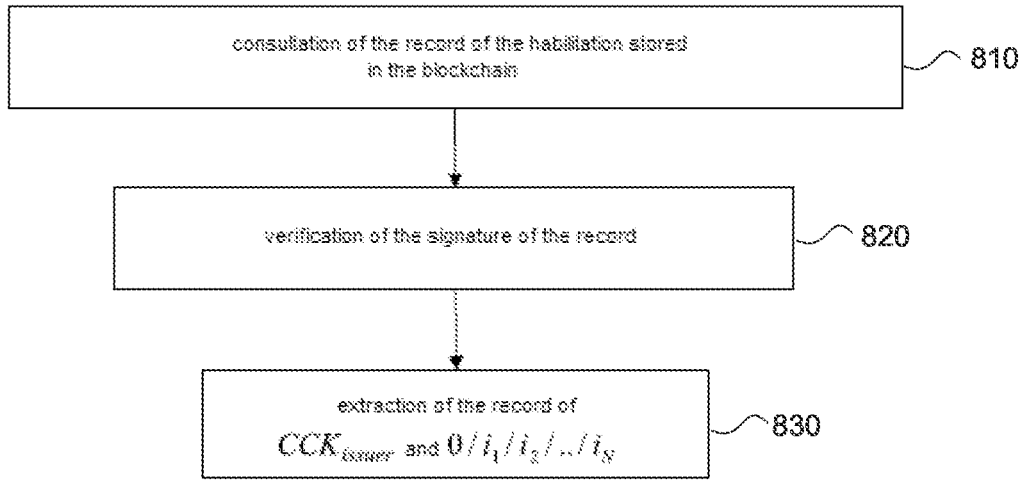
FIG. 8 schematically represents a method for verifying the habilitation of a terminal to formulate a claim covering an identity attribute.

FIG. 8 details step 730 and schematically represents a method for verifying the habilitation of a terminal to formulate a claim covering an identity attribute.

At a first step 810, the miners consult the record of the habilitation stored in the blockchain, this record may be in the form of a certificate or an attestation signed by the competent authority.

At step 820, we verify using the public key of the competent authority that the signature is correct, and at step 830 we extract from the record the code chain $CCK_{issuer}$ as well as the path $0/i_1/i_2/\ldots/i_N$ encoding the identity attribute for which the habilitation to issue a claim is granted.

Figure 9:
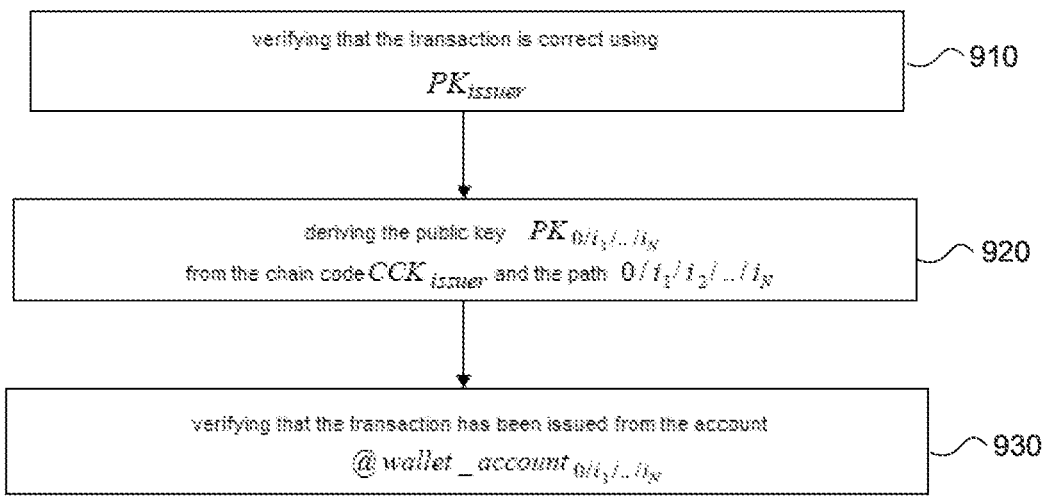
FIG. 9 schematically represents a method for verifying the compliance of a transaction with said habilitation of the terminal.

FIG. 9 details step 735 and schematically represents a method for verifying the compliance of a transaction with said habilitation of the terminal.

In a first step, 910, the miners verify using the public key of the terminal, $PK_{issuer}$, extracted from the signature, that the transaction has been signed by the corresponding private key, in other words that the signature is correct.

At step 920, from the public key, $PK_{issuer}$, the code chain $CCK_{issuer}$ obtained at step 820 and the path $0/i_1/i_2/\ldots/i_N$, specified in the field 'path' of the transaction, we generate the public key, $PK_{0/i_1/\ldots/i_N}$, of the wallet account specified by this path.

At step 930, we check on that the transaction has been issued by the account @wallet_account$_{0/i_1/\ldots/i_N}$ while hashing the public key $PK_{0/i_1/\ldots/i_N}$ obtained at the previous step and by comparing it with the issuing address of the transaction. In other words, we verify by consensus that the issuing address of the transaction corresponds to the identity attribute on which the terminal is habilitated to issue a claim.

Of course, steps 920 and 930 could be performed before step 910.

FIG. 7B represents the remainder of the operations of FIG. 7A.

At step 750, the interrogation terminal sends to the attribute server a query representing the claim on the identity attribute. This query also comprises the digital identity of the holder of the CNIe.

At step 755, the attribute server consults the blockchain to determine whether an authorisation has been delivered to the interrogation terminal related to said identity attribute. If this is not the case, the server returns an error message to the terminal (a non-represented step).

On the contrary, if an authorisation is actually recorded in the blockchain, the attribute server requests at 760 from the identity checkup server to verify the validity of the CNIe by transmitting thereto the digital identity of the holder.

The latter reads at 765 the identity token associated to said digital identity in the blockchain and at step 770 determines the validity of the CNIe from said token and cryptographic primitives, then returns the status of the considered card.

If the card is valid, the attribute server determines the reply to the claim from the attributes stored in the attribute base at 775 and returns the reply to the terminal at 780.

It should be noted that the holder of the CNIe could consult the blockchain and determine which identity attribute is covered by the claim of the interrogation terminal.

The invention claimed is:

1. A method for interrogating an electronic identity card, denoted CNIe, by a terminal, with a claim covering an identity attribute of a holder of said card, said identity attribute being part of an identity attribute arborescence, said method comprising:
   (a) an obtainment by the terminal of an identity token of the holder of the CNIe;
   (b) a selection by the terminal of an issuer account associated to a node in the arborescence of a hierarchical deterministic key wallet, called HD wallet, having the same structure as the identity attribute arborescence, the selected node unequivocally corresponding to the identity attribute covered by the claim;
   (c) a formation by the terminal of a transaction comprising as arguments at least the identity token and a path in the arborescence of the wallet leading to the issuer account;
   (d) an issue by the terminal of said transaction addressed to a first smart contract deployed on a blockchain;
   (e) a verification by consensus that the terminal is habilitated to issue a claim on said identity attribute;
   (f) a verification by consensus that the issuing address of the transaction corresponds the identity attribute on which the terminal is habilitated to issue a claim; and
   (g) a record of an interrogation authorisation in the blockchain if the verifications of steps (e) and (f) are positive.

2. The method for interrogating an electronic identity card by a terminal according to claim 1, wherein the identity token comprises a digital identifier of the holder of the CNIe as well as a nonce signed by a private key stored in the CNIe.

3. The method for interrogating an electronic identity card by a terminal according to claim 1, wherein the verification of step (e) comprises a consultation of a record of said habilitation in the blockchain, the verification of an electronic signature of said record with a public key of an habilitation authority and, in case of success, an extraction of the path in the arborescence of the HD wallet leading to the issuer account as well as a code chain associated to the account of the terminal.

4. The method for interrogating an electronic identity card by a terminal according to claim 3, wherein said habilitation is recorded in the blockchain with a second smart contract distinct from the first one.

5. The method for interrogating an electronic identity card by a terminal according to claim 3, wherein the verification at step (f) comprises a verification of correctness of the signature of the transaction with the public key of the terminal.

6. The method for interrogating an electronic identity card by a terminal according to claim 3, wherein the verification at step (f) further comprises a computation of the public key of the issuer account from the public key of the terminal, the code chain associated to the account of the terminal as well as the path in the arborescence leading to the issuer account.

7. The method for interrogating an electronic identity card by a terminal according to claim 6, wherein the verification of step (f) comprises a comparison of the address of the issuer account of the transaction with a hash of the public key of the issuer account thus computed, the interrogation authorisation being recorded in the block chain in case of identity.

8. The method for interrogating an electronic identity card by a terminal according to claim 1, wherein the terminal issues a query to an identity attribute server, said query representing said claim on the identity attribute and wherein the identity attribute server consults the blockchain to determine whether an authorisation has been delivered to an interrogation terminal relating to said identity attribute.

9. The method for interrogating an electronic identity card by a terminal according to claim 8, wherein if the identity attribute server determines that the authorisation has actually been delivered, it requests a verification of the validity of the CNIe from an identity checkup server, the latter verifying the validity of the CNIe from the identity token read in the blockchain.

10. The method for interrogating an electronic identity card by a terminal according to claim 9, wherein if the CNIe is determined to be valid, the identity attribute server builds a reply to the claim covering the identity attribute from a database of these attributes and transmits the reply to the terminal.

* * * * *